United States Patent
Skibo

[19]

[11] Patent Number: 5,544,475
[45] Date of Patent: Aug. 13, 1996

[54] DUAL HITCH

[75] Inventor: Dennis Skibo, Manheim, Pa.

[73] Assignee: Pequea Machine, Inc., Gordonville, Pa.

[21] Appl. No.: 278,904

[22] Filed: Jul. 22, 1994

[51] Int. Cl.$^6$ ................................................ A01D 78/00
[52] U.S. Cl. ................................ 56/15.5; 56/218; 56/365; 56/DIG. 14
[58] Field of Search ..................... 56/15.5, 13.5, 56/13.8, 15.1, 15.6, 218, 365, 370, 375, DIG. 14

[56] References Cited

U.S. PATENT DOCUMENTS

| | | | |
|---|---|---|---|
| 4,179,870 | 12/1979 | Rowse | 56/218 X |
| 4,979,359 | 12/1990 | Inskeep | 56/15.5 X |
| 5,025,616 | 6/1991 | Moss | 56/15.1 X |
| 5,201,167 | 4/1993 | Rowse | 56/13.8 X |
| 5,412,929 | 5/1995 | Urbain et al. | 56/DIG. 14 X |

*Primary Examiner*—Terry Lee Melius
*Attorney, Agent, or Firm*—Hartman Underhill & Brubaker

[57] ABSTRACT

This invention provides a dual hitch whereby two rakes, tedders or other trail implements can be operated at one time behind a tractor. The dual hitch is designed so that the implements towed by the tractor may be hitched and operated without alteration to the implements themselves. The dual hitch provides the needed operative components. The forward part of the dual hitch mounts on the three-point-hitch of the tractor. A pivot is provided in the dual hitch to allow the rearward implement to operate selectively on a swath to either side of the tractor and the forward implement. In an embodiment of this invention, a hydraulic system is part of the dual hitch to provide adequate power to the rearward implement.

26 Claims, 6 Drawing Sheets

DUAL HITCH

FIELD OF INVENTION

This invention relates to a hitch whereby two rakes, tedders or other implements can be operated in tandem behind a tractor.

BACKGROUND OF INVENTION

To save time, hitch frames have been provided heretofore whereby two implements can be towed and operated simultaneously behind a tractor. For road travel, the implements are adapted to be positioned one behind the other. In the field, a front implement operates on a swath directly behind the tractor, the same as when only one implement is used. With a dual hitch, a rear implement is adapted to be positioned to operate on a swath next to the swath of the front implement. The dual hitch is designed so that the rear implement can be shifted to operate selectively to the right or left of the front implement.

Rakes and tedders are available either ground driven or power operated. When the crop to be harvested is of substantial volume, a ground drive to a reel may not provide adequate power for the harvesting operation. Ground speed may have to be curtailed by the tractor operator. To allow for faster ground speeds, rakes and tedders are available which are power driven. In some prior art arrangements, a drive is provided by modifying ground driven implements with a hydraulic motor for each implement reel. This involves reconstruction of the implements to have a normally ground driven rake or tedder power driven. Substantial expense can be involved in achieving such a change over.

When the implements used are power driven, such as rakes or tedders having a power-take-off drive train connectable to the output shaft of a tractor, the implements can be underpowered when the two units are used at the same time behind a tractor. This will depend on the size of the tractor, the hydraulic system available and the power available to properly operate the rearward implement behind the dual hitch.

Conventionally, a dual hitch frame simply connects to the drawbar of the tractor. The front implement connects to the tractor and is powered directly by the power output shaft of the tractor. In addition, a drive is provided from the tractor through the dual hitch frame to the rear implement.

SUMMARY OF INVENTION

One object to his invention is to provide an improved dual hitch frame to which two rakes, tedders or other implements, whether ground driven or power operated, can be towed behind a tractor and used without modification of the implements to be towed. The implements connect to the hitch frame, as is.

Another object of this invention is to provide a dual hitch having a forward end which attaches to the three-point-hitch on a tractor, the arched main frame of the dual hitch having a pivot between the three-point-hitch connection and a wheel supported rear end of the hitch.

Another object of this invention is a dual hitch where a front implement has an unimpeded power-take-off path to the output drive on a tractor.

Another object of this invention is to provide a dual hitch where a rearward implement is driven by a hydraulic system on the hitch whereby adequate power is available for the rear implement during dual harvesting operations of two implements.

A further object of this invention is to provide a rearward transverse arch on a dual hitch through which a drive may extend so that a rearward implement may be connected thereto without modification of the implement.

A further object of this invention is to provide a dual hitch having a drive and hitch member for a rearward implement, the drive and hitch member being in the same vertical plane and in constant relation to each other whereby a power drive to the rearward implement is simplified.

Other objects of the invention will be apparent hereinafter from the specification and from the recitals in the appended claims.

DESCRIPTIONS OF PREFERRED EMBODIMENT

Referring now the drawings by numerals of reference and first to FIGS. 1–3, 10 denotes a conventional tractor having a three-point-hitch 11 including a pair of lower arms 12 and an upper link 14.

Figure 1:
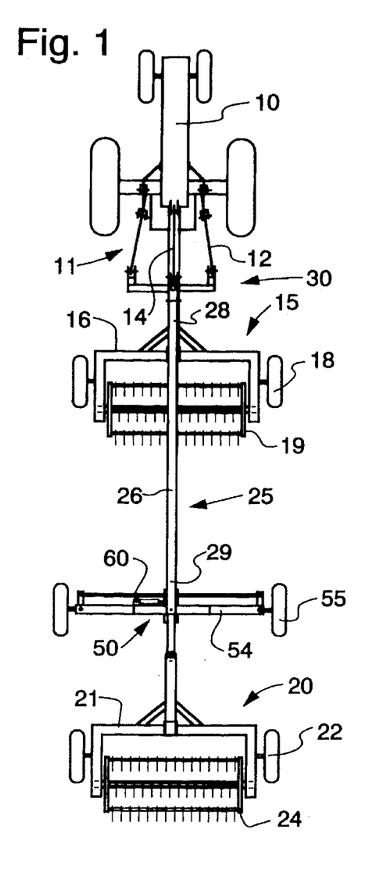
FIG. 1 is a diagrammatic plan view showing a tractor towing two implements one behind the other, for road transport, using a dual hitch constructed according to this invention.
Figure 2:
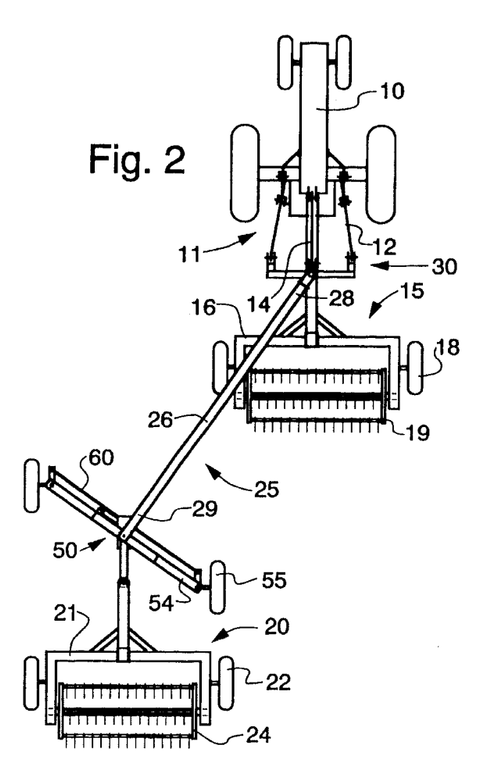
FIG. 2 is a view similar to FIG. 1 showing a front implement directly behind the tractor and a rear implement shifted to the left of the tractor and the front implement relative to the direction of travel.
Figure 3:
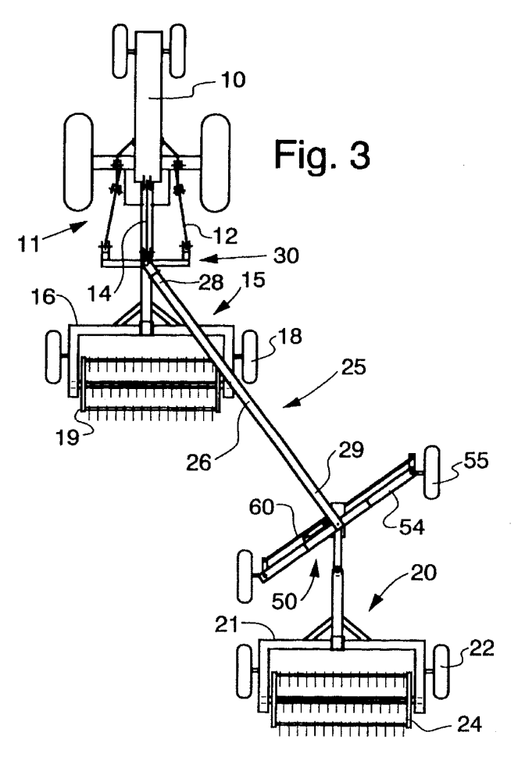
FIG. 3 is a view like FIG. 2 showing the rear implement shifted to the right of the tractor and the front implement.

Trailing behind the tractor are a pair of implements such as two side delivery rakes, rake tedders or other harvesters. Both implements are of the same configuration. The front implement 15 has a frame 16 supported on ground wheels 18 and a reel 19. The rear implement 20 has a frame 21 ground wheels 22 and reel 24.

Figure 7:
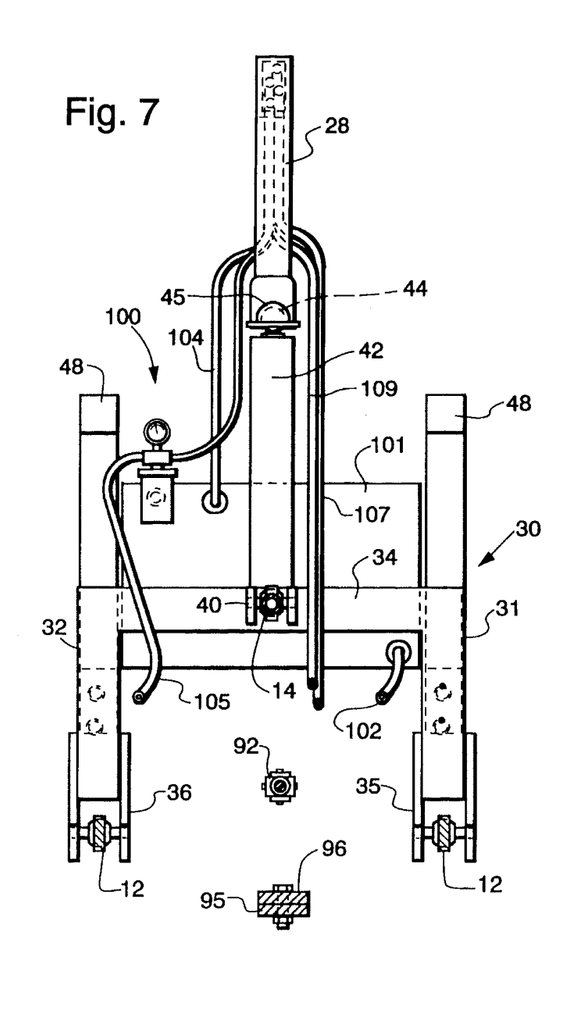
FIG. 7 is a vertical section taken on the line 7—7 of FIG. 4 looking in the direction of the arrows showing the connection of the forward end of the dual hitch to the tractor three-point-hitch.

To connect front implement 15 and rear implement 20 to the tractor to be towed thereby, a dual hitch 25 is provided having an arched fore-and-aft extending main frame 26 having a forward end 28 and a rearward end 29. At the forward end of the frame 26 there is a front transverse arch 30 having spaced vertically extending legs 31 and 32 connected by a horizontal crossbar 34, see FIGS. 4, 5 and 7. At the lower ends of legs 31 and 32 are brackets 35 and 36 pivotally connected at 38 to arms 12 of the three-point-hitch 11 of tractor 10.

Crossbar 34 of arch 30 has forwardly extending bracket 40 pivotally connected at 41 to link 14 of the three-point-hitch 11 of the tractor. Extending upwardly of the center of crossbar 34 is a vertical post 42 on top of which is a ball 44. Seated on top of ball 44 is a cup 45 on the forward end 28 of the main frame 26. The ball 44 and cup 45 provide a pivotal connection at the forward end of the hitch frame to the transverse arch 30 of the frame. A conventional spring-biased lock 46 (FIG. 5) is provided to maintain the pivotal connection.

With this structure, the transverse arch 30 of dual hitch 25 mounts on the three-point-hitch 11 of the tractor. The ball and socket connection 44–45 of the fore-and-aft extending frame 26 connects to arch 30 in a manner whereby the rearward end 29 of the frame may swing right or left relative to the arch.

Figure 4:
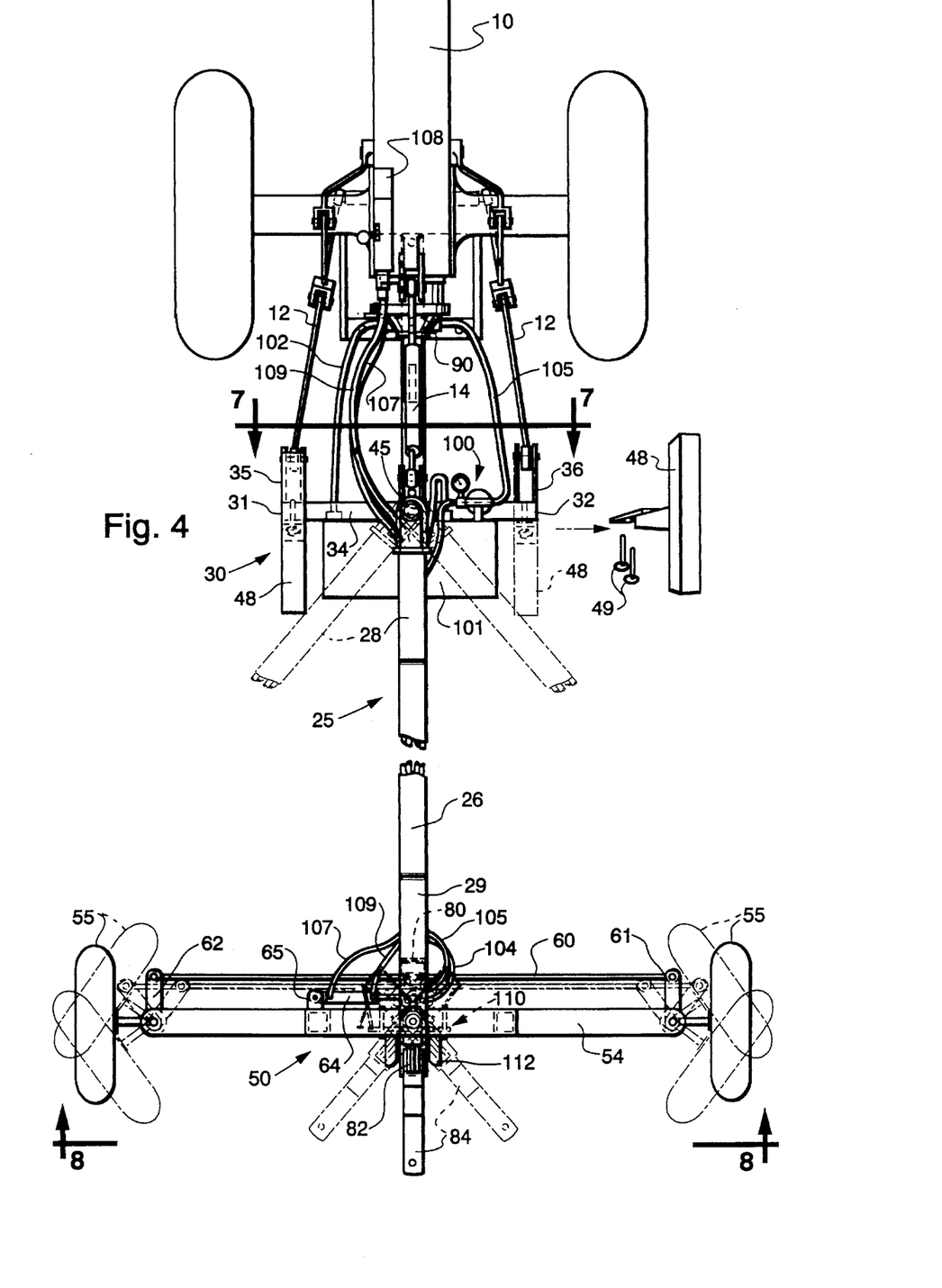
FIG. 4 is an enlarged fragmentary plan view showing the dual hitch of this invention connected at its forward end to the three-point-hitch of the tractor and the wheel support of the hitch at its rearward end.
Figure 5:
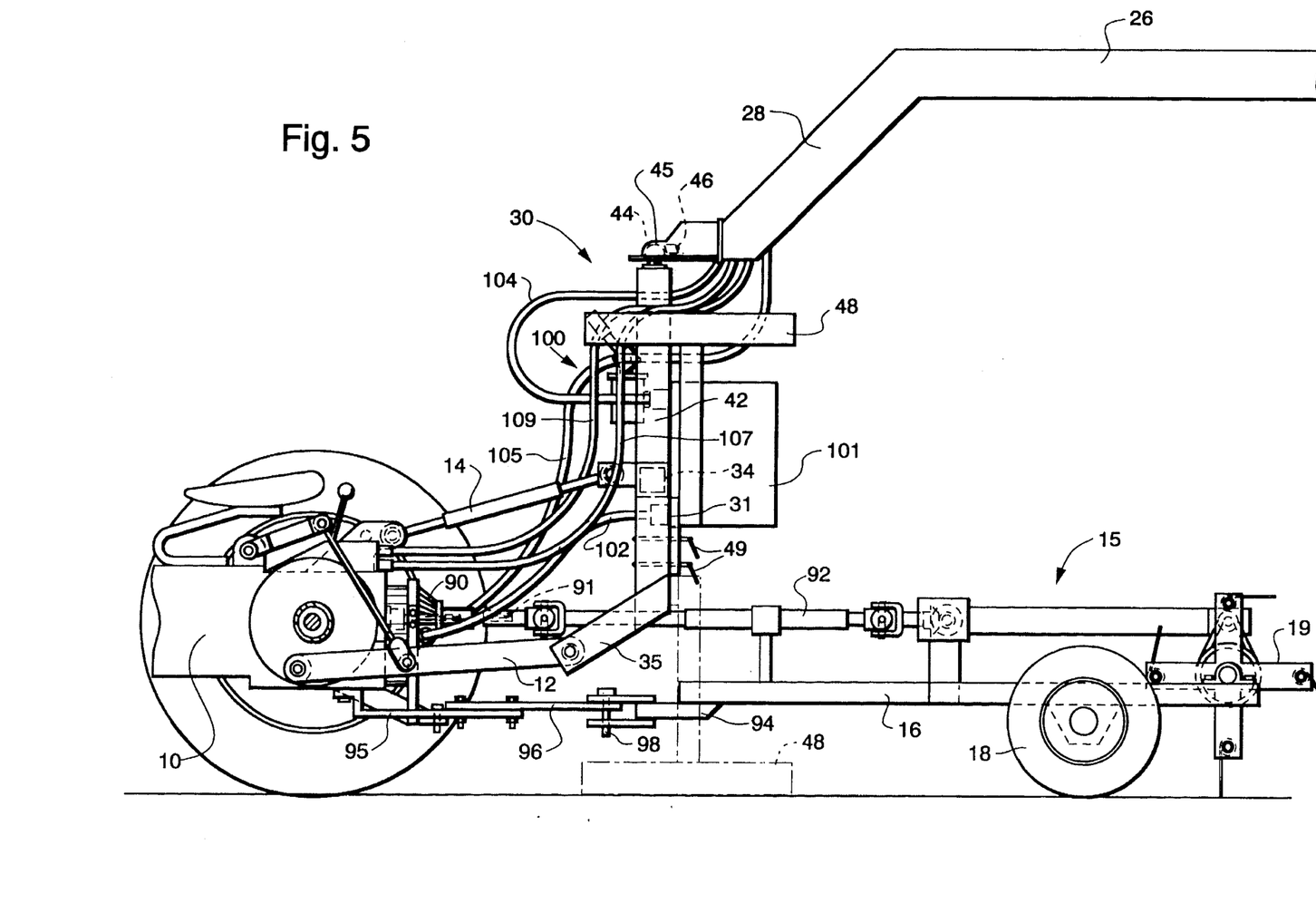
FIG. 5 is a side elevation of the forward end of the dual hitch and the mounting thereof on the three-point-hitch of the tractor, and the front implement connection to the tractor.

To support dual hitch 25 when the hitch is disconnected from the tractor, a pair of T-shaped support legs 48 shown in a retracted up position in solid lines FIGS. 4 and 5 and in a lowered support position on the ground in dotted lines. The supports 48 are manually positioned either up or down by the operator and attached in place on the forward arch 30 by attachment pins 49 which connect to the legs 31 and 32 of the arch.

Figures 6, 11:
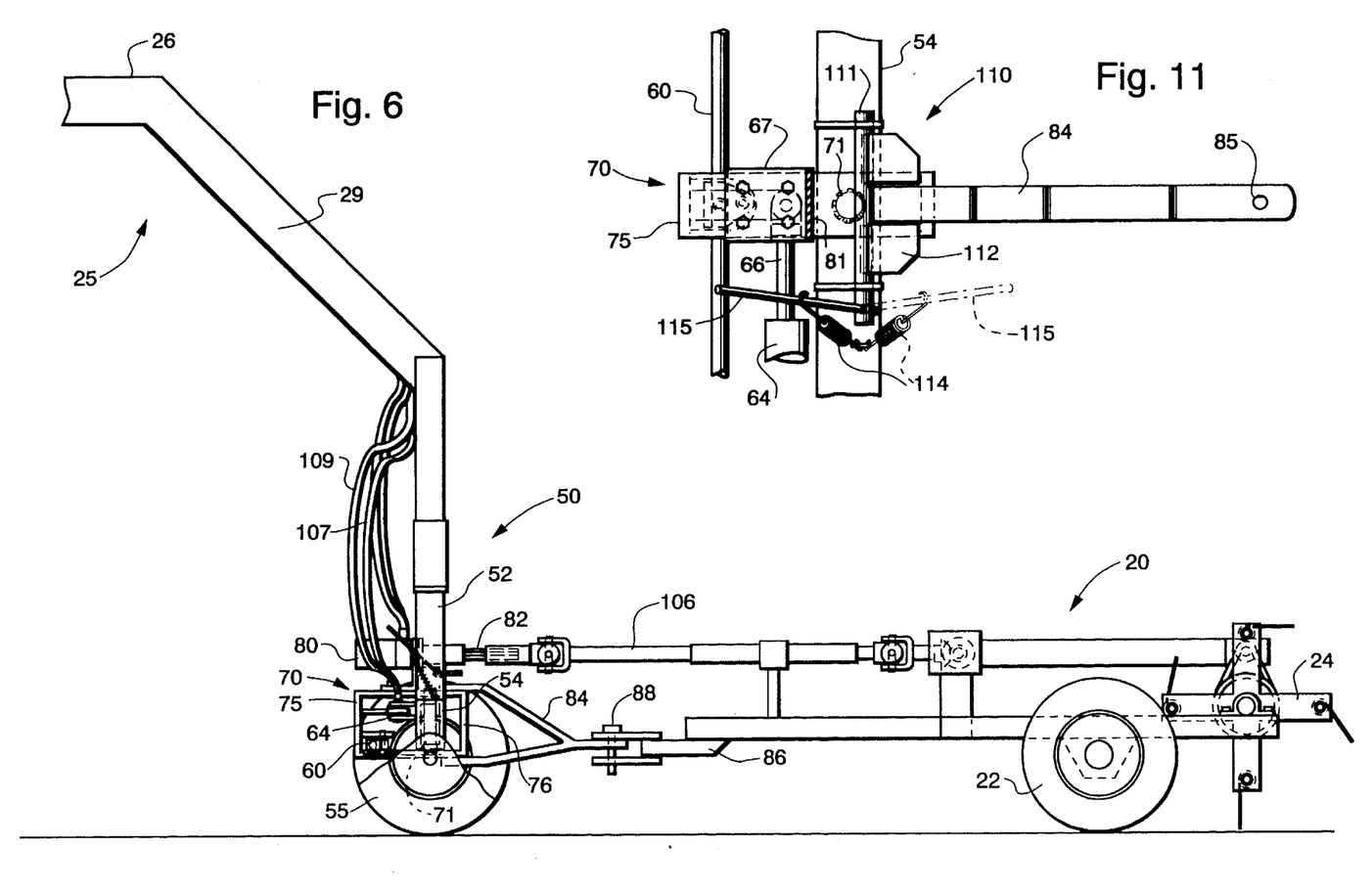
FIG. 6 is a side elevation of the rearward end of the dual hitch showing the rear implement, the drive to the implement and the connection of the implement to the dual hitch.
FIG. 11 is a section on the line 11—11 of FIG. 9 showing the latch for locking the hitch member to the rear implement in a center road-transport position.
Figure 8:
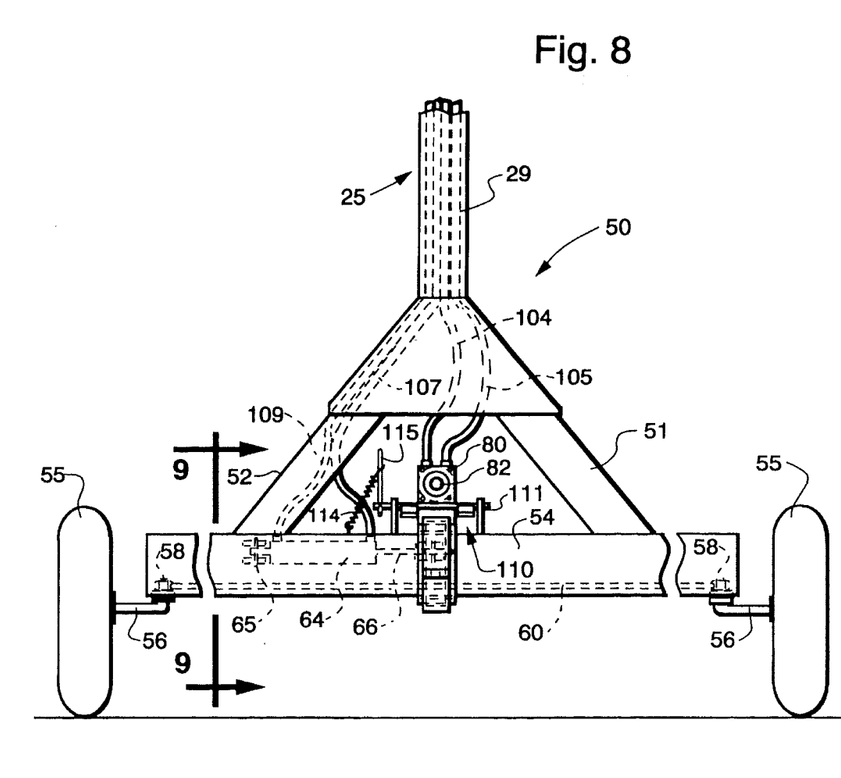
FIG. 8 is an elevation from the rear of the dual hitch, part section, taken on the line 8—8 of FIG. 4 showing the design of the rearward end of the hitch.
Figure 9:
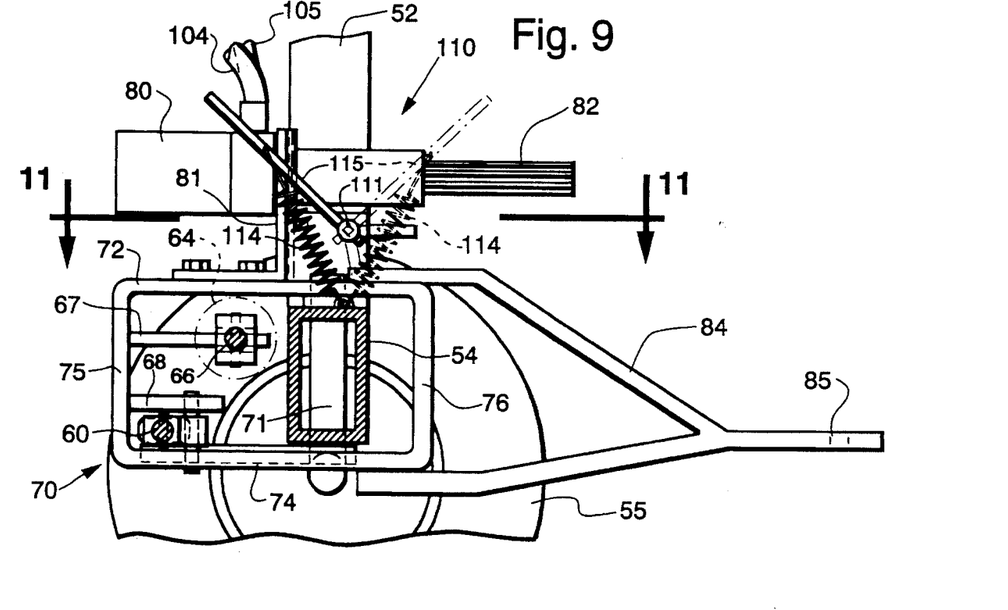
FIG. 9 is an enlarged section on the line 9—9 of FIG. 8 showing the drive and the swingable hitch member for the rear implement.

At its rearward end 29, the arched main frame 26 of dual hitch 25 has an inverted V-shaped arch 50, FIGS. 4, 6 and 8, formed with arms 51 and 52 which connect to a transverse beam 54, box shaped in cross-section, as shown in FIG. 9. Beam 54 and frame 26 form a fixed T-shaped relationship. Beam 54 extends horizontally. At its ends, beam 54 is supported on ground wheels 55 carried on L-shaped spindles 56, pivotal on vertical axes at 58 relative to the beam.

To pivot wheels 55 and thereby steer beam 54, main frame 26 and the rearward implement 20 to the right or left of tractor 10, a tie-rod 60, FIGS. 4 and 8, is pivotally connected at it ends 61 to arms 62 from the wheel spindles 56. Tie-rod 60 is reciprocated by a push-pull hydraulic cylinder 64 pivotally supported at one end 65 on beam 54 and at its opposite end by a piston rod 66 pivotally connected to a bracket 67, FIG. 9, in a support housing 70 carried on the beam.

Figure 10:
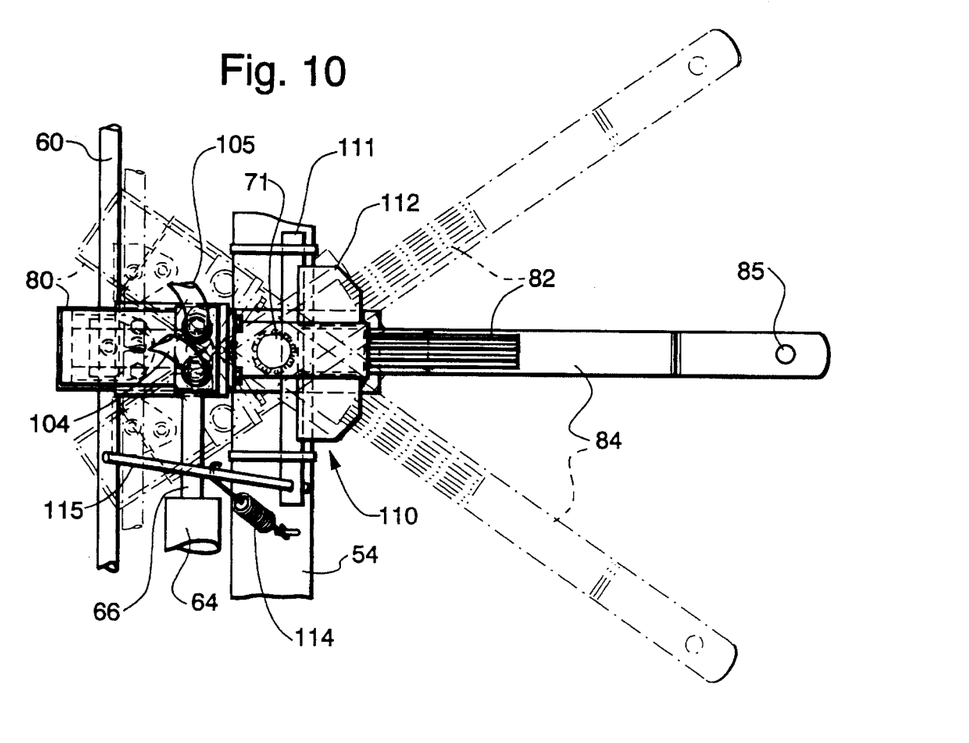
FIG. 10 is a plan view of FIG. 9 showing in solid lines the center position of the drive and hitch member for the rearward implement and in dotted lines the left and right positions thereof.

Housing 70 surrounds beam 54, FIGS. 9–10, and is mounted thereon by a king pin 71 on the beam. Pin 71 extends vertically and provides an axis about which housing 70 may swing from side to side. Housing 70 has a top wall 72, bottom wall 74, front wall 75 and a rear wall 76. Tie-rod 60 passes through housing 70 and it is connected thereto by the bracket 68 affixed to the front wall 75 of the housing. When housing 70 is pivoted, tie-rod 60 is shifted longitudinally and the wheels 55 of beam 54 are pivoted to the positions shown in FIG. 4 to steer rearward implement 20 either to the right or left of the path of tractor 10 and forward implement 15.

A hydraulic motor 80, FIGS. 6, 8–10, is carried on a bracket 81 mounted on top wall 72 of housing 70. Motor 80 extends in a fore-and-aft direction relative to beam 54. It has a rearwardly extending power-take-off shaft 82 for rear implement 20.

Also connected to housing 70 and affixed to top wall 72 and bottom wall 74 is a rearwardly extending hitch member 84 having a hitch point 85 to which the drawbar 86 of the rearward implement 20 pivotally connects by means of a hitch pin 88, FIG. 6.

Shaft 82 of motor 80 extends above and in the same vertical plane as hitch number 84, FIG. 10. Regardless of the pivoted position of housing 70, whether in the center location as shown in solid lines in FIG. 10 or to the left or right of the center position as show in dotted lines in such Figure, the vertical alignment of shaft 82 and hitch 84 remains the same.

At the forward end of dual hitch 25, the structure includes a through shaft adapter pump 90, FIGS. 4 and 5, mounted on the output shaft of the tractor 10. Pump 90 is of conventional design; it has a drive shaft 91 which extends rearwardly. The drive train 92 of forward implement 15 connects to shaft 91 of pump 90. This drive train passes beneath and through arch 30 of dual hitch 25.

A hitch 94 (FIG. 5) on front implement 15 is spaced rearwardly from drawbar 95 of tractor 10. An extension piece 96 is provided to bridge the space from hitch 94 on implement 15 to tractor drawbar 95. A connection is provided by hitch pin 98. Extension 96 is needed because of the rearward spacing of the implement 15 resulting from the adapter pump 90 on the tractor shaft. Hitch 94 is in generally the same fore-and-aft vertical plane as the ball and cup, 44 and 45, pivotal connection in the dual hitch frame.

Mounted on front transverse arch 30 of dual hitch 25 is a hydraulic system 100 including a reservoir tank 101 and a hose connection 102 from pump 90 to the bottom of the tank. Another hose 104 travels from the top of tank 101 through main frame 26 for connection to one side of hydraulic motor 80 on beam 54. A second hose 105 connects from the opposite side of motor 80 back and through frame 26 to pump 90. Through this network, hydraulic force is applied to motor 80 to drive shaft 82 and power train 106 to reel 24 of rearward implement 20.

To operate hydraulic cylinder 64 and thereby control the pivoting of housing 70 on beam 54, a hose 107 extends from the hydraulics 108 on tractor 10 to one end of the cylinder. A second hose 109 extends from the opposite end of the cylinder back to the tractor hydraulics. Hoses 107 and 109 are channeled through arched main frame 26, FIGS. 4–5.

Mounted on rear beam 54 is a manually operated latch 110, FIGS. 9–11, having a pivot pin 111. The latch has tabs 112 adapted to extend to a down position on each side of hitch 84 and to an up retracted position where hitch 84 is free to pivot. An over-center spring 114 is connected between a handle 115 and beam 54 to hold tabs 112 in an up or down position.

When latch 110 is in a down position, hitch 84 is locked in a center location so that the rearward implement trails directly behind the tractor 10 and forward implement 15 as shown in FIG. 1. When disconnected with latch 110 is in released position, hitch 85 is free to swing to the left or right of its central location as desired by the operator to position the rear implement to the left or right of front implement 15 and tractor 10, as shown in FIGS. 2 and 3.

In operation, dual hitch 25 of this invention is positioned with supports 48 at the front of the hitch on the ground and connected to arched frame 30 to provide a support for the forward end of the dual hitch. A tractor is backed into position. The arms 12 and link 14 of three-point-hitch 11 of the tractor are connected to brackets 35 and 36 of the legs 31 and 32 and bracket 40 of crossbar 34. With the front end of the dual hitch supported on the tractor, supports 48 are disconnected from frame 30 and moved to the solid line elevated position shown in FIG. 5. Front implement 15 beneath frame 26 is connected to the drawbar extension 96 of the tractor by the hitch pin 98. Power train 94 of the front implement is connected to the output shaft 91 of the adapter pump 91.

Hose 102 is connected from the reservoir 101 of the dual hitch hydraulic system 100 to the adapter pump 90 on tractor 10. Hose 105 is also connected to pump 90. The hoses 107 and 109 to operate hydraulic cylinder 64 are connected to the hydraulic system 108 of the tractor.

At the rear of dual hitch 25, rearward implement 20 is connected to hitch number 84 by the hitch pin 88. The power-take-off drive train 106 of the rear implement connects to the output shaft 82 of hydraulic motor 80. For road travel, rearward hitch number 84 is locked in a center position by latch 110 as shown in solid position in FIGS. 4, 10 and 11. With rear hitch 84 centrally located, when the operator on the tractor tows front implement 15 and rear implement 20 to the field for use, they are drawn one behind the other directly behind the tractor, as shown in FIG. 1.

When the harvesting operation is to occur in the field, latch 110 is moved from a down locked position to an upward position to release hitch number 84 and housing 70 for swinging movement about king pin 71 on beam 54. The hydraulic connection to cylinder 64 is actuated to cause the wheels on beam 54 to be pivoted to one of the positions shown in dotted lines in FIG. 4 whereby when the tractor pulls forwardly, rear implement 20 is shifted selectively to the left of the tractor as shown in FIG. 2 or to the right of the tractor as shown in FIG. 3. The side location of the rearward implement 20 is controlled by cylinder 64. When operated in a side position, the latch 110 remains in an up inoperative position. In controlling the location of rearward implement 20, the tractor operator can swing the rear unit from side to side, from the position shown in FIG. 2 to the position in FIG. 3 and back.

With this dual hitch design, implements 15 and 20 employed in tandem do not have to be modified. Everything that the farmer needs is provided in the dual hitch structure. Front implement 15 connects directly behind tractor 10 and operates on a swath the same as when a single implement is employed. Rearward implement 20 is located to the right or left of forward implement 15 so that a swath is operated on which adjoins the swath worked on by the forward implement. The rearward implement is preferably located so that there is a slight overlap of the swath raked, teddered or the like by the front implement.

When swung from side to side, the rear of dual hitch 25 pivots about the ball and socket 44 and 45 at the front end of the hitch frame supported on arch 30 at the front of the structure. Being of inverted U-shaped design, the front arch provides an open passageway for the power train 92 of front implement 15 to be connected to shaft 91 of adapter pump 90 on the output shaft of the tractor. Hitch 94 of the front implement connects to the tractor drawbar 95 through extension 96.

Rearward implement 20 readily connects to hitch member 84 and to the power shaft 82 of the hydraulic motor 80. Actuating cylinder 64 causes the tie-rod 62 to reciprocate to move the wheels 55 on beam 54 to properly position the rear implement, FIG. 2 or FIG. 3, as desired.

By having its own hydraulic system 100 as part of dual hitch 25, there is adequate power to properly drive the reel 24 on rear implement 20 in heavy crop conditions. This provides for the situation where the hydraulic power available from the tractor is inadequate to operate two implements at the same time, where both are power driven.

Although dual hitch 25 is particularly adapted to tow two power driven implements, it can also be used with ground driven rakes, tedders and the like where the force to drive the reels comes from the rotation of the ground wheels. In such case, it is only the hydraulic cylinder 64 which is operated from the tractor to cause a shifting of the rear implement.

When the harvesting operation is completed, the supports 48 at the front of the hitch frame are dropped down to the ground and attached to the forward arch 30 of the hitch frame, the dotted position in FIG. 5. The hose connections to the tractor are disconnected and also the connections to the three-point-hitch of the tractor. Pump 90 can be removed. Then the tractor may be used for other purposes and dual hitch 25 is self-supported to be available for subsequent use.

Although this invention has been described in connection with certain embodiments thereof, it will be understood that it is capable of modifications without departing from the inventive concept involved with this dual hitch as described in this specification and in the appended Claims.

Having thus described my invention what I claim is:

1. A dual hitch for towing two rakes, tedders and other implements behind a tractor, each implement having its own wheel-supported frame and a reel, the tractor having a three-point-hitch, the two implements including a front implement which tracks behind the tractor and a rear implement postitionable selectively in three positions, a first position of the rear implement being in-line with the front implement and the tractor for road travel, a second position for a swath to the left of the swath engaged by the front implement and a third position to the right of the front implement swath, comprising, in combination:

a fore-and-aft extruding main frame having a forward and a rearward end;

a front transverse arch having spaced vertically extending legs and a cross bar;

means connecting said front arch legs and said cross bar to the three-point-hitch of the tractor;

a pivotal connection between said forward end of said main frame and said front arch;

a hitch of said front implement extending through said front arch for connection to the tractor drawbar;

a transverse beam at said rearward end of said main frame;

a pair of ground wheels on opposite ends of said beam and pivotal about vertically extending axes;

a rear transverse arch on said rearward end of said main frame and having arms connected to said beam on opposite sides of a central portion of the beam;

a hitch member on said beam to which the rear implement connects to be towed behind said beam;

steering means carried on said beam between said wheels whereby the wheels can be pivoted to selectively steer the beam and the rear implement to the left or the right of the front implement; and a connection to the hydraulic system of the tractor and extending along said main frame to said rearward end and said beam to operate said steering means.

2. A dual hitch as recited in claim 1 wherein said pivotal connection between said forward end of the main frame and said front arch comprises a ball carried on said arch and a socket on said main frame forward end which seats on top of said ball, said rearward end of the main frame being swingable to the left and to the right of the pivotal connection.

3. A dual hitch as recited in claim 1, wherein a pair of supports are provided and connected to said legs of the front arch for movement from a lowered down position wherein the supports rest on the ground and carry the front end of the main frame and an elevated up position when the front arch is connected to the tractor three-point-hitch.

4. A dual hitch as recited in claim 3 wherein fasteners are provided to attach said supports to said front arch in said down and up positions.

5. A dual hitch as recited in claim 1 wherein said steering means on said transverse beam comprises tie rod means connected to said pair of ground wheels and a push-pull cylinder to shift the tie rod means and pivot the wheels, and said connection between the tractor hydraulic system and said cylinder controlling the pivoted location of said wheels.

6. A dual hitch as recited in claim 5 wherein a latch is provided on said beam to lock said wheels from pivoting about said vertically extending axes with the rear implement directly behind the first implement and the tractor.

7. A dual hitch as recited in claim 1 wherein said hitch member on said transverse beam for the rear implement is swingable right and left of a central portion of the beam and around a vertical pivot on said beam.

8. A dual hitch as recited in claim 1 wherein said front transverse arch is in an inverted U-shape form positioned to provide an area between the legs of the arch and below the cross bar through which the front implement connects to the tractor.

9. A dual hitch as recited in claim 8 wherein an extension is provided from a tractor drawbar to a hitch on the front implement.

10. A dual hitch as recited in claim 9 wherein the hitch connection of said front implement to the tractor drawbar and said pivotal connection between the front end of the main frame to said transverse arch are generally in the same vertical plane.

11. A dual hitch as recited in claim 1 wherein said main frame and said transverse beam form a fixed T-shape when viewed from above, the ground wheels on said beam and the hitch for the rear implement being pivotal relative to said beam.

12. A dual hitch for towing two rakes, tedders and other implements behind a tractor, each implement having its own wheel-supported frame and a power driven reel, the tractor having a three-point-hitch, the two implements including a front implement which tracks behind the tractor and a rear implement postitionable selectively in three positions, a first position of the rear implement being in-line with the front implement and the tractor for road travel, a second position for a swath to the left of the swath engaged by the front implement and a third position to the right of the front implement swath, comprising, in combination:

a fore-and-aft extruding main frame having a forward end and a rearward end;

a front transverse arch having spaced vertically extending legs and a cross bar;

means connecting said front arch legs and said cross bar to the three-point-hitch of the tractor;

a pivotal connection between said forward end of said main frame and said front arch;

a through shaft power-take-off pump mountable on the output shaft of the tractor;

said front implement being attachable to a drawbar of the tractor and having a power-take-off extending through said front arch and connected to the shaft of said pump;

a transverse beam at said rearward end of said main frame;

a pair of ground wheels on opposite ends of said beam and pivotal about vertically extending axes;

a rear transverse arch on said rearward end of said main frame and having arms connected to said beam on opposite sides of a central portion of the beam;

a hitch on said beam to which the rear implement connects to be towed behind said beam;

steering means carried on said beam between said wheels whereby the wheels can be pivoted to selectively steer the beam and the rear implement to the left or the right of the front implement;

a hydraulic motor on said beam to which a power-take-off on the rear implement connects to drive the implement; and connecting means from said pump on the tractor to said motor on said beam to provide a power drive from said forward end to said rearward end of the main frame to drive the rear implement.

13. A dual hitch as recited in claim 12 wherein said motor extends through said rear transverse arch and has a drive shaft for connection to said rear implement.

14. A dual hitch as recited in claim 12 wherein a self-contained hydraulic system is mounted on said main frame and connected to said pump on the tractor, said system including a reservoir and hoses from the reservoir to said motor and back to the pump on the tractor to provide a circuit to drive the rear implement.

15. A dual hitch as recited in claim 14 wherein said front implement has a hitch, an extension between a drawbar on the tractor and said hitch to connect the first implement to the tractor, the pump shaft drawbar and the pivotal connection of the main frame to said front transverse arch all being generally in the same fore-and-aft vertical plane.

16. A dual hitch for towing two rakes, tedders and other implements behind a tractor, there being a front implement and a rear implement and each implement having its own wheel-supported frame and a power driven reel, comprising, in combination:

a fore-and-aft main frame having a forward end and a rearward end;

means pivotally connecting the forward end of the frame to the tractor;

wheel means supporting the rearward end of the frame to the tractor three-point-hitch;

means connecting the front implement to the tractor to be drawn and powered thereby;

means connecting the rear implement to said rearward end of the frame;

a through shaft power-take-off pump mounted on the power output shaft of the tractor;

said pump having a power shaft to which the front implement is connected;

a hydraulic system on said main frame connected to said pump;

and said system including a hydraulic motor at the rear of said frame having a drive shaft to operate the rear implement.

17. In a dual hitch for towing two rakes, tedders and other implements behind a tractor, a forward implement connected behind the tractor, an arched fore-and-aft main frame which connects to the tractor at a forward end and extends over the front implement to a rearward end supported on a transverse beam having a pair of ground wheels pivotal about vertically extending axes, means for steering said wheels to selectively locate a rearward implement directly behind the forward implement or to the left or right thereof, and means on said beam for driving a rearward implement and connecting the rearward implement to the beam, comprising, in combination:

a vertically extending king pin on said beam between said ground wheels;

a support on said king pin and pivotal relative to said beam;

a hydraulic motor mounted on said support and having a rearwardly extending drive shaft thereon connected to said rearward implement;

a rearwardly extending hitch member attached to said support to which a drawbar on the rearward implement connects;

said shaft on said motor and said hitch member being in the same vertical plane and in a fixed location relative to each other whereby when said support pivots on said beam, the shaft and hitch member move in union and maintain their same operative positions;

and means for pivoting said support selectively to one side of a central position or to the other side thereof.

18. In a dual hitch as recited in claim 17 wherein said hydraulic motor extends in a horizontal direction with its shaft extending above said hitch member.

19. In a dual hitch as recited in claim 17 wherein there is a tie rod to said pair of ground wheels:

means connecting said tie rod to said support whereby when the support is pivoted, the tie rod is reciprocated;

and said means for pivoting said support being a push-pull hydraulic cylinder.

20. A dual hitch as recited in claim 17 wherein said support is box-like in cross-section and surrounds said beam:

said hitch member to the rear implement having arms one of which extends over and the other under said support and affixed thereto.

21. A dual hitch as recited in claim 20, where an L-shaped support is fastened on top of said box like support and on which said hydraulic motor is carried.

22. A dual hitch as recited in claim 19 wherein a manually operable latch is pivoted on said beam from an up position where said support, motor and implement hitch may swing relative to said beam and a down position where the implement hitch is locked center position wherein the rear implement is positioned to trail directly behind the tractor.

23. A dual hitch as recited in claim 22 wherein said latch pivots about a horizontal axis parallel to the extension of said beam.

24. A dual hitch as recited in claim 22, wherein said latch has an over-center spring to hold said latch selectively in an up unlocked position or down locked position.

25. A dual hitch as recited in claim 22 wherein said latch has a pair of spaced tabs positioned on opposite side of the implement hitch when the latch is in down position.

26. A dual hitch for towing two rakes, tedders and other implements behind a tractor having a three-point-hitch, there being a front implement and a rear implement and each implement having its own wheel-supported frame, comprising, in combination:

a fore-and-aft main frame having a forward end and a rearward end;

means pivotally connecting a forward end of the frame to the tractor three-point hitch;

means connecting a front implement to the tractor to be drawn and driven thereby;

means connecting a rear implement to said rearward end of the frame;

a hydraulic power system on said frame;

means on the rear portion of said frame and inter-connected between said hydraulic system and said rear implement to drive the rear implement; and means connecting one end of said system to an output on the tractor and an opposite end to operate said power driven reel on the rear implement.

* * * * *